United States Patent
Maki

(10) Patent No.: US 6,202,668 B1
(45) Date of Patent: Mar. 20, 2001

(54) VALVE WITH FIRE-RESISTANT SEAL

(75) Inventor: Robert E. Maki, Oklahoma City, OK (US)

(73) Assignee: North American Corporation, Oklahoma City, OK (US)

(*) Notice: Subject to any disclaimer, the term of this patent is extended or adjusted under 35 U.S.C. 154(b) by 0 days.

(21) Appl. No.: 09/044,765

(22) Filed: Mar. 20, 1998

(51) Int. Cl.[7] .............................. F16K 41/04; F16J 15/24

(52) U.S. Cl. .................. 137/72; 251/214; 251/315.13; 251/315.14; 251/368; 277/359; 277/500; 277/914; 277/931; 277/938; 277/946

(58) Field of Search ............... 137/72, 74; 251/214, 251/315.01, 315.13, 315.14, 368; 277/359, 471, 914, 931, 938, 946, 500

(56) References Cited

U.S. PATENT DOCUMENTS

| | | | |
|---|---|---|---|
| 2,647,721 | * 8/1953 | Volpin | 137/72 |
| 3,177,887 | * 4/1965 | Priese | 137/74 |
| 3,630,483 | 12/1971 | Canalizo | 251/174 |
| 4,082,105 | 4/1978 | Allen | 137/72 |
| 4,273,148 | * 6/1981 | Charland | 137/72 |
| 4,289,157 | 9/1981 | McGee | 137/72 |
| 4,332,370 | 6/1982 | Williams | 251/214 |
| 4,474,203 | 10/1984 | Meyer | 137/72 |
| 4,519,412 | 5/1985 | Grazioli | 137/72 |
| 4,558,874 | * 12/1985 | Williams et al. | 251/214 |
| 4,570,659 | * 2/1986 | Karr, Jr. | 251/214 |
| 4,658,847 | 4/1987 | McCrone | 137/72 |
| 4,792,118 | * 12/1988 | Yusko, Jr. et al. | 251/214 |
| 4,822,000 | 4/1989 | Bramblet | 251/298 |
| 4,976,403 | 12/1990 | Bramblet | 251/214 |
| 5,056,758 | 10/1991 | Bramblet | 251/214 |

OTHER PUBLICATIONS

North American–Nutron Company Brochure entitled "Floating Ball Valves Series F150, Series F300, Series F600" (Apr., 1997).

North American–Nutron Company Brochure entitled "Floating Ball Valves, Carbon & Stainless Steel, Series C25, Series C30" (Apr., 1997).

North American–Nutron Company Brochure entitled "Floating Ball Valves, Ductile Iron, Series D15, Series D20" (Apr., 1997).

Garlock, Inc. Brochure entitled "9000 EVSP Simplified, the sensible solution to demanding valve sealing requirements" (Apr., 1995).

Exhibits A–C—Sheets 1–3, respectively, of patent application filed herewith.

Exhibit D—Drawing of emergency valve manufactured by Corken, Inc. (undated by admitted to be prior art.

* cited by examiner

Primary Examiner—George L. Walton
(74) Attorney, Agent, or Firm—McAfee & Taft

(57) ABSTRACT

A valve with fire-resistant seal for use in industrial piping applications. The valve includes a valve body with a valve element therein. The valve is illustrated as a ball valve, but other valve configurations could also be used. A valve stem engages the valve element so that it can be rotated between open and closed positions. A conventional primary seal is used on the valve stem for normal conditions. The valve body defines a body bearing surface, and the valve stem defines a facing stem bearing surface. A thrust bearing is disposed between the body and stem bearing surfaces, and a fire-resistant seal is positioned radially inwardly from the thrust bearing. Initially, the fire-resistant seal is not engaged with at least one of the body or stem bearing surfaces, and the fire-resistant seal has a thickness less than an initial thickness of the thrust bearing. If the valve is subjected to heat such that the thrust bearing is destroyed or damaged, pressure loading on the valve stem forces the fire-resistant seal into sealing engagement between the body and valve stem. At least a portion of the fire-resistant seal is forced into a cavity defined in the body by a chamfered surface.

55 Claims, 6 Drawing Sheets

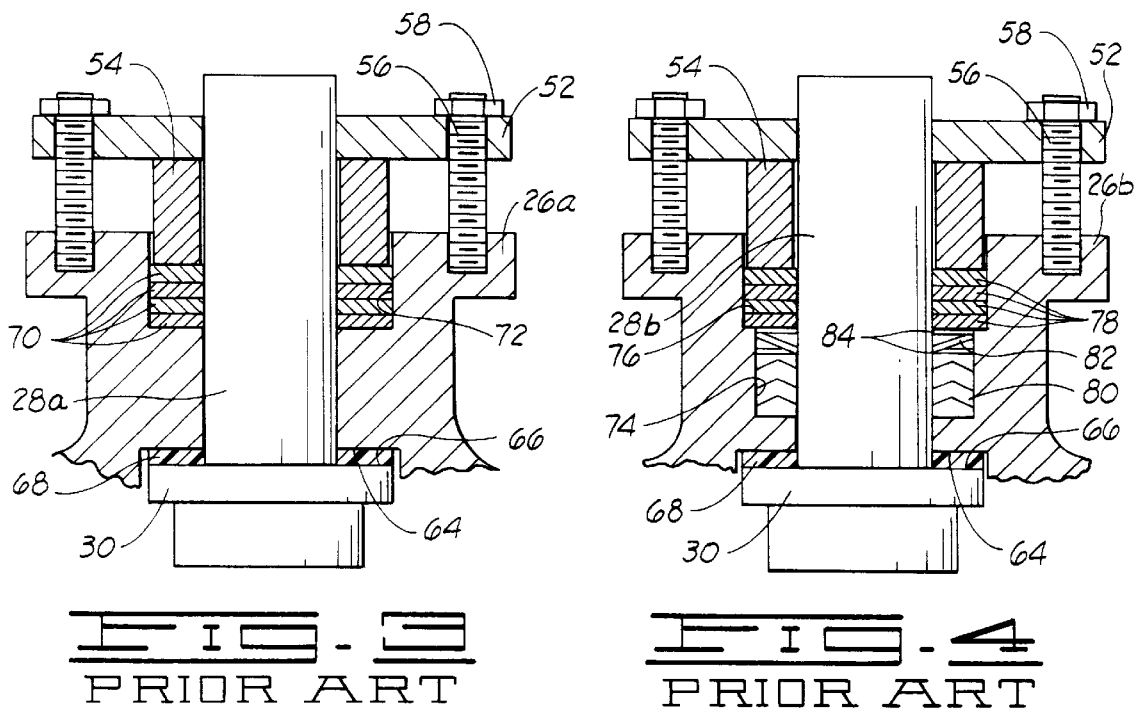
FIG-3 PRIOR ART
FIG-4 PRIOR ART
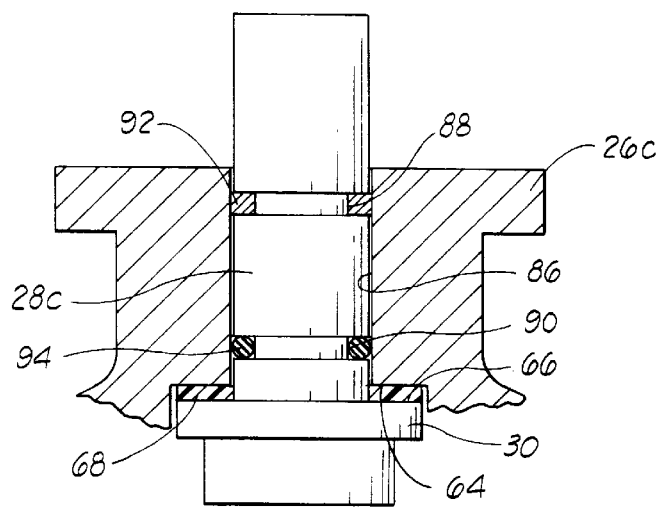
FIG-5 PRIOR ART

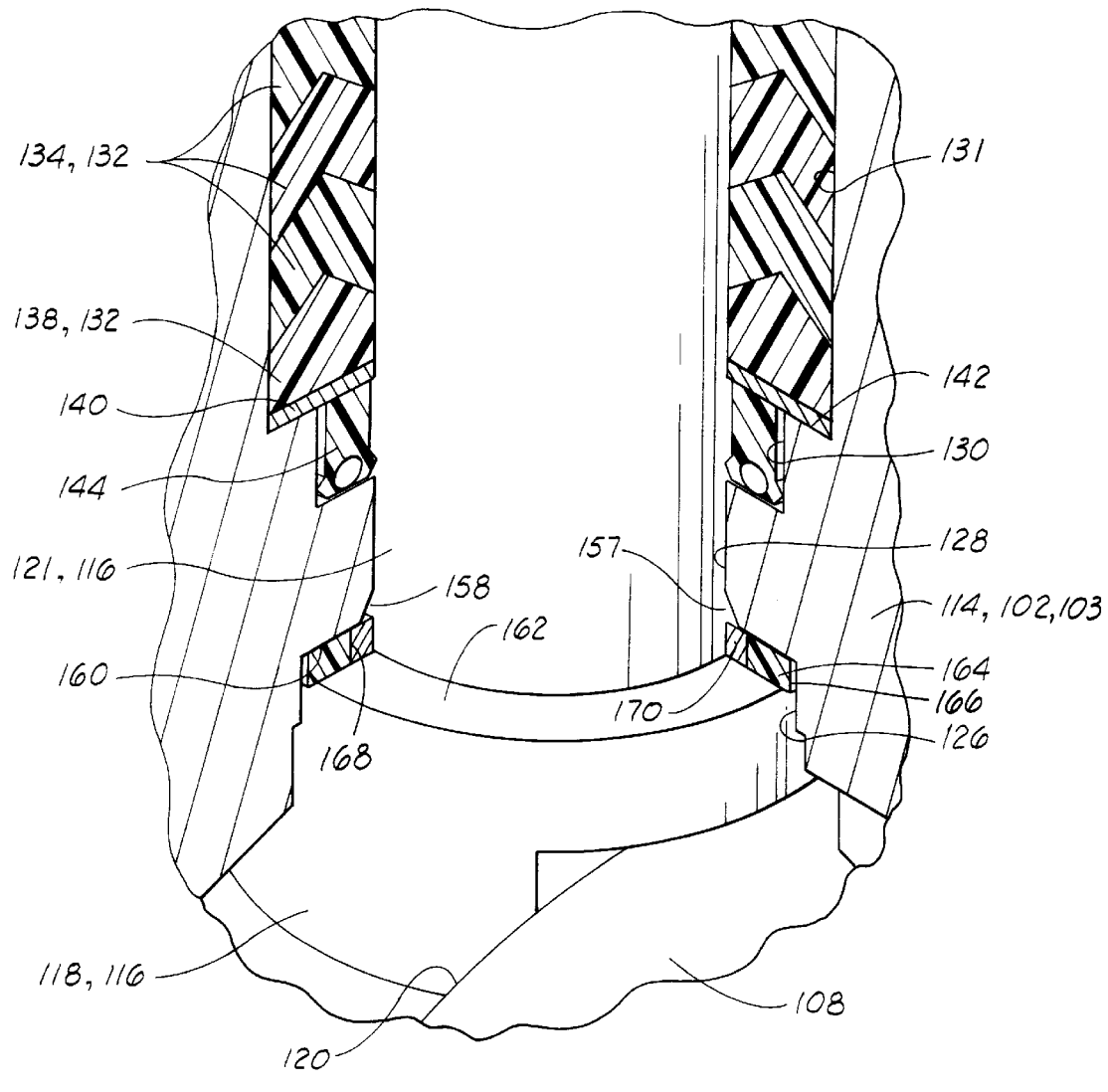

VALVE WITH FIRE-RESISTANT SEAL

BACKGROUND OF THE INVENTION

1. Field of the Invention

This invention relates to valves for industrial applications, and more particularly, to a valve having a fire-resistant seal which provides sealing therein when the valve is subjected to heat which can damage other sealing components therein.

2. Description of the Prior Art

Valves for use in controlling the flow of fluid through conduits or pipes are well known. A great variety of valves have been developed for various applications, and many of these are rotary valves which are operated by rotating a valve stem extending from a valve housing. One popular rotary valve configuration is the ball valve which has a rotating ball within a housing. The ball is actuated by a valve stem which is engaged with the ball. When the valve is closed, the ball blocks flow of fluid through the valve, and when the valve is open, a port through the ball is aligned with the inlet and outlet ports of the housing. A major advantage of ball valves is that they have substantially no restrictions therethrough and do not cause any significant pressure drop through the valve which can impede fluid flow.

Standards have been developed for industrial application valves by standards organizations, such as the American Petroleum Institute (API). These standards provide specifications for both design, materials and performance criteria, depending upon the application. It is particularly important in applications handling toxic or flammable fluids that these fluids are not released to the atmosphere in the event of fire or other catastrophe. To this end, a variety of sealing arrangements have been employed. A problem with such previous designs is that they use large radial graphite seals which need continual attention and maintenance to insure that they function when needed. Relatively high constant loading of such seals is necessary to overcome the potential of leakage to the atmosphere. Such high loads necessary to maintain the integrity of the seal result in increasing torque necessary to operate the valve. Further, the graphite seals can cause corrosion on the rotary valve stems, and this further increases the possibility of leakage. Details of some prior art valves will be discussed in more detail herein.

The valve of the present invention eliminates the need for a large graphite seal and the attention that such a seal requires. This is done by replacing the large graphite seal with a more resilient seal material and including a relatively smaller fire-resistant graphite seal which works only in the event of sufficient heat being applied to the valve. The new seal design of the present invention also results in considerably reduced loading and a corresponding reduction in torque necessary to operate the valve.

SUMMARY OF THE INVENTION

The valve of the present invention is designed with a fire-resistant seal for use in industrial applications where high heat conditions may exist and where maintaining the sealing of the fluid in the valve is critical under such conditions. The valve apparatus of the present invention comprises a body defining a pair of ports therein, a stem rotatably disposed in the body, a valve element engaged with the stem and movable in said body by rotation of the stem between an open position in which the ports in the body are in fluid communication and a closed position in which fluid communication between the ports is prevented, and a sealing apparatus for sealing the rotatable stem in the body both when in normal operation and when the valve is subjected to fire or other extreme heat conditions.

The sealing apparatus comprises a primary sealing means for sealing between the stem and the body during normal conditions, a thrust bearing disposed between the stem and body and adapted for absorbing thrust loading on the stem, and a fire-resistant seal disposable between the stem and body and adapted for sealing between the stem and body if the thrust bearing is substantially damaged by heat. In the preferred embodiment, the body has a body bearing surface thereon, and the stem has a stem bearing surface thereon spaced from the body bearing surface. The stem bearing surface is biased in an axial direction toward the body bearing surface by thrust loading from fluid pressure in the body. The thrust bearing is disposed between the body and stem bearing surfaces and is initially engaged therewith such that the thrust loading on the stem is absorbed. The fire-resistant seal is disposed between the body and stem bearing surfaces and is initially unengaged with at least one of the body and stem bearing surfaces. That is, the fire-resistant seal has a thickness less than an original thickness of the thrust bearing. The thrust bearing seals have an annular configuration and are generally concentric. The fire-resistant seal has an outside diameter smaller than an inside diameter of the thrust bearing and fits therein.

The thrust bearing is preferably made of a non-metallic, resilient material. For example, but not by way of limitation, the resilient material may be reinforced polytetrafluorethylene (PTFE).

The fire-resistant seal is preferably made of a heat-resistant material such that, if the thrust bearing is damaged by heat applied thereto, the fire-resistant seal will sealingly engage both of the body and stem bearing surfaces. A preferred heat-resistant material, but not by way of limitation, for the fire-resistant seal is graphite.

The space between the body bearing surface and stem bearing surface is substantially annular, and the thrust bearing and fire-resistant seal are initially disposed therein. A cavity is defined in the valve body adjacent to the body bearing surface and the fire-resistant seal. The cavity is formed by a chamfered surface extending from the body bearing surface. When sufficient heat is applied to the valve to damage the resilient material of the thrust bearing, the thrust loading on the valve stem caused by fluid pressure in the body will move the body and stem bearing surfaces together, and the material of the thrust bearing will be destroyed and/or extruded out of the space between the body and the stem bearing surfaces. As this occurs, the fire-resistant seal will sealingly engage both the body and stem bearing surfaces, as previously described, and sufficient thrust loading on the stem will cause at least a portion of the fire-resistant seal to be forced into the chamfered cavity. When this occurs, the fire-resistant seal will sealingly engage the surface of the chamfered cavity and also sealingly engage the radially outer surface of the stem and will further sealingly engage the stem bearing surface.

When the fire or high heat condition has been eliminated, and it is safe to dismantle the valve, the fire-resistant seal and the remains of the thrust bearing are easily removed and replaced with new components, assuming that the other parts of the valve are still safe to use.

Numerous objects and advantages of the invention will become apparent as the following detailed description of the preferred embodiment is read in conjunction with the drawings which illustrate such embodiment.

BRIEF DESCRIPTION OF THE DRAWINGS

FIG. 3 shows a prior art fire-resistant seal for a valve stem.

FIG. 4 shows another prior art fire-resistant seal for a valve stem.

FIG. 5 shows an additional prior art fire-resistant seal for a valve stem.

FIG. 6 illustrates a cutaway perspective of the valve with fire-resistant seal of the present invention.

FIG. 7 is an enlarged perspective cutaway showing details of the sealing apparatus used in the valve of the present invention.

DETAILED DESCRIPTION OF PRIOR ART VALVES AND SEALS

Referring to FIGS. 1–5, details of some prior art valves will be discussed.

Figure 1:
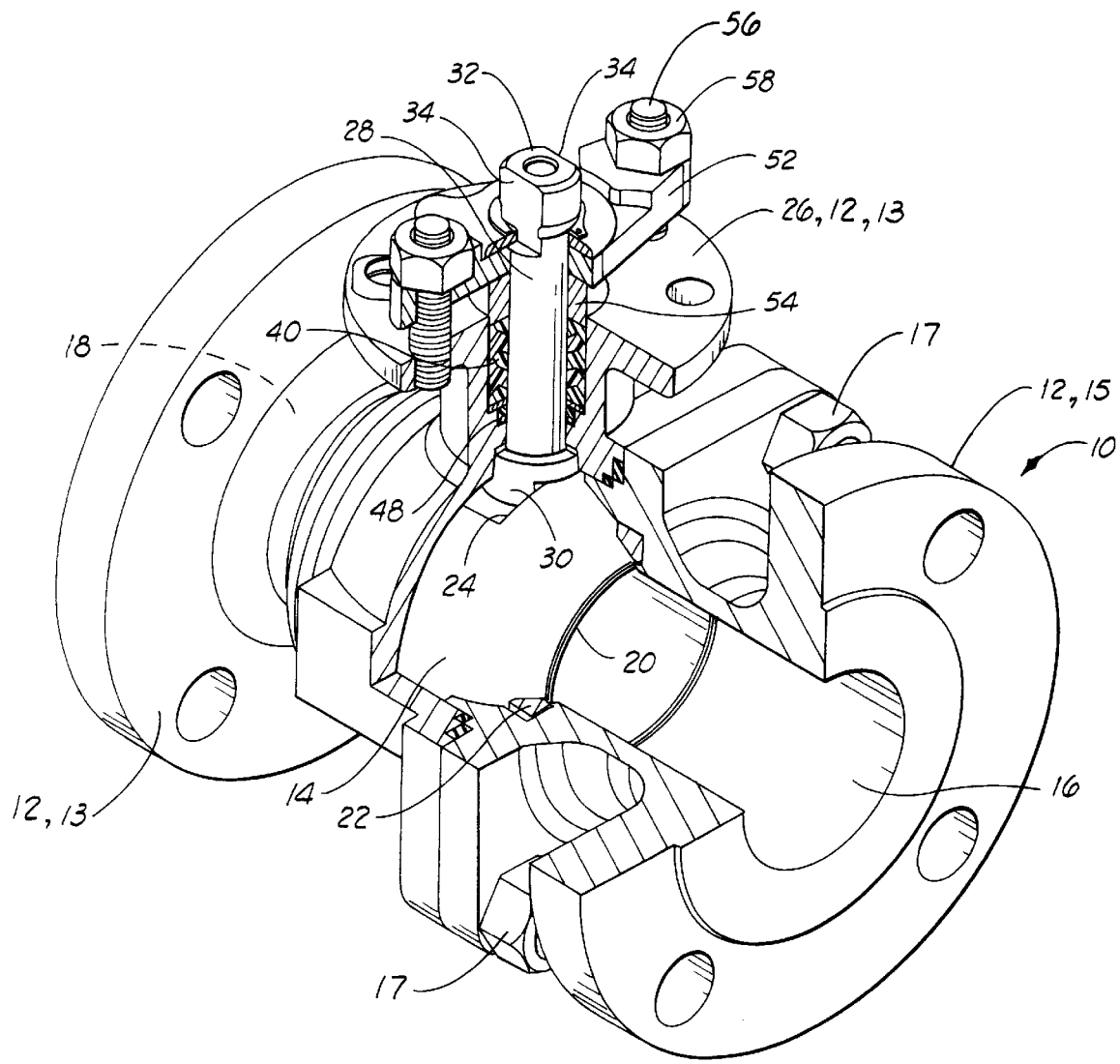
FIG. 1 is a cutaway perspective of a prior art valve.
Figure 2:
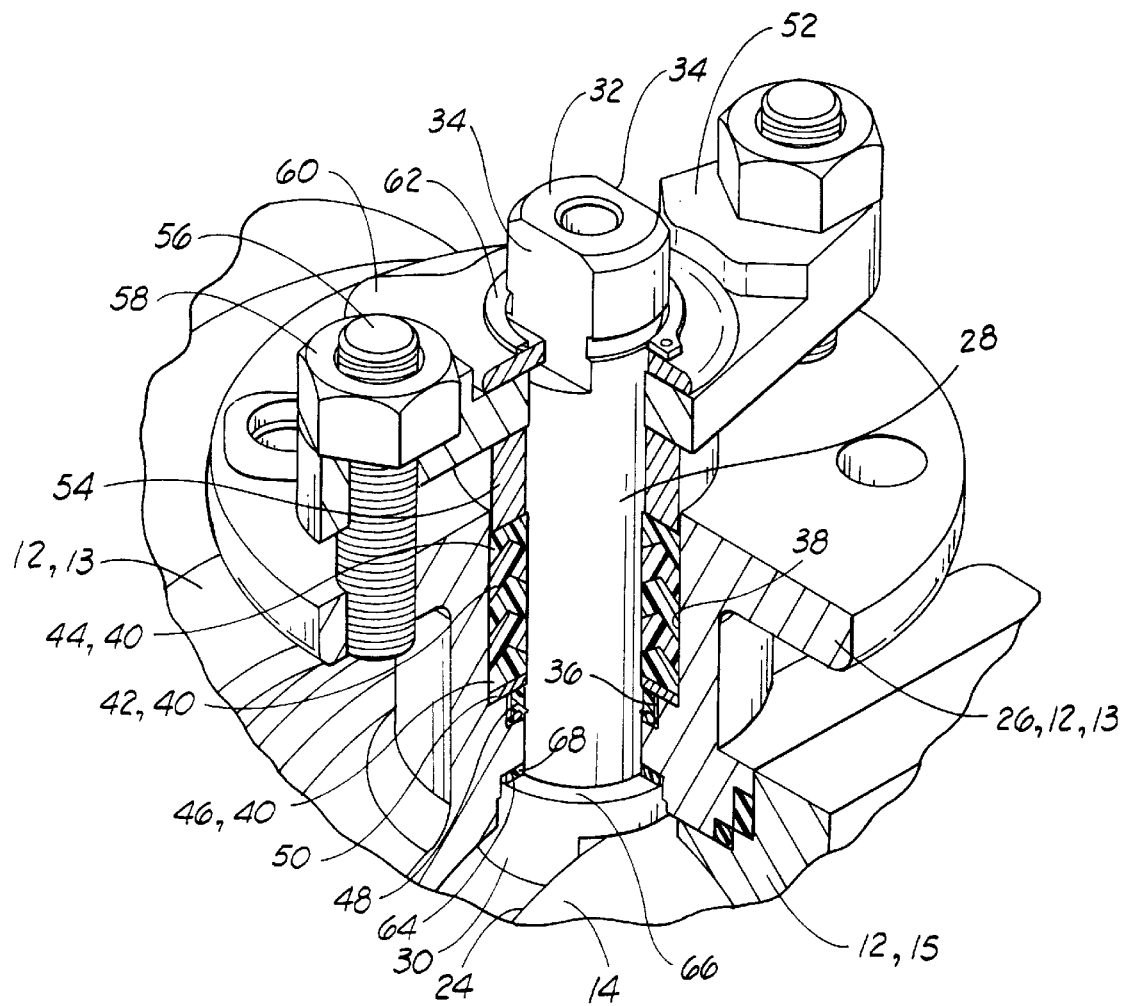
FIG. 2 is an enlarged view of a portion of the valve shown in FIG. 1.

FIGS. 1 and 2 illustrate a typical floating ball valve assembly 10 having a valve body 12 with a ball element 14 rotatably disposed therein. Valve body 12 comprises a body portion 13 and an adapter 15 forming flanged ports 16 and 18 therein, respectively. Body portion 13 and adapter 15 are connected by fasteners 17. Depending upon the orientation of valve 10, ports 16 and 18 may be either inlet or outlet ports for valve body 12.

Ball element 14 defines an opening 20 extending therethrough. In FIG. 1, valve 10 is shown in an open position wherein opening 20 in ball element 14 is aligned with ports 16 and 18, thus placing the ports in valve body 12 in communication with one another. To close valve 10, ball 14 is rotated approximately 90° so that opening 20 therein is no longer aligned with ports 16 and 18 in valve body 12. Ball sealing elements, such as seal 22, seal on the outer surface of ball element 14.

Ball element 14 has a slot 24 therein generally directed toward a stem seal housing portion 26 of body portion 13 of valve body 12. A valve stem 28 has an inner end 30 which engages slot 24 in ball element 14. Valve stem 28 also has an outer end 32 which extends outwardly from stem seal housing 26. Outer end 32 of valve stem 28 has a pair of flats 34 thereon which are adapted for engagement by a wrench for rotation of the valve stem in a manner known in the art.

Stem seal housing 26 defines a first bore 36 and a larger second bore 38 therein. A packing set 40 having a plurality of V-rings 42, a female ring 44 and a male ring 46, is disposed in second bore 38 of stem seal housing 26. A pressure or spring energized seal 48 is disposed in first bore 36 of stem seal housing 26, and a washer 50 separates packing set 40 from seal 48.

A packing retainer 52 is disposed outside stem seal housing 26 and engages a packing follower 54 which, in turn, engages packing set 40. Packing retainer 52 is attached to stem seal housing 26 by a fastening means known in the art, such as a plurality of studs 56 and nuts 58. By tightening nuts 58, packing retainer 52 and packing follower 54 apply a load on packing set 40 so that the packing set sealingly engages second bore 38 in stem seal housing 26 and the outer surface of valve stem 28.

A locking ring 60 is attached to outer end 32 of valve stem 28 by a retainer ring 62. When retainer ring 62 is in place, locking ring 60 limits rotation of valve stem 28.

At a position spaced below first bore 36 in stem seal housing 26, valve body 12 defines a body bearing surface 64 thereon. Body bearing surface 64 generally faces a stem bearing surface 66 defined on inner end 30 of valve stem 28. A thrust bearing 68 is disposed between body bearing surface 64 and stem bearing surface 66 to absorb outwardly directed thrust on valve stem 28 caused by fluid pressure in valve 10. Thrust washer 68 is preferably made of a resilient, self-lubricating material, such as polytetrafluorethylene (PTFE).

Valve 10 as shown in FIGS. 1 and 2 is suitable for many applications, but it does not have any significant fire-resistant sealing capability. Referring now to FIGS. 3–5, various fire-resistant sealing configurations are shown. In each of these embodiments, there is a body bearing surface 64, a stem bearing surface 66 and a thrust bearing 68 as described for the valve shown in FIGS. 1 and 2.

In the prior art valve arrangement shown in FIG. 3, a plurality of graphite rings 70 are disposed around valve stem 28a in a bore 72 defined in a stem seal housing portion 26a of the valve. Graphite rings 70 are held in place by a packing follower 54 and a packing retainer 52 as previously described.

In FIG. 4, a stem seal housing portion 26b of a valve is shown having a first bore 74 and a larger second bore 76 therein. A plurality of graphite rings 78 are disposed around valve stem 28b in second bore 78, and a packing set 80 is disposed around the valve stem in first bore 74. Graphite rings 78 are held in place as previously described by a packing follower 54 and a packing retainer 52. Loading is provided on packing set 80 by a Belleville washer or spring 82 disposed between graphite rings 78 and packing set 80. Washers 84 may be positioned on opposite sides of Belleville spring 82 as desired.

The prior art valve of FIG. 5 has a stem seal housing portion 26c with a rotating stem 28c extending through a bore 86 defined in the stem seal housing. Valve stem 28c has a pair of grooves 88 and 90 defined therein. A graphite ring or rope 92 is disposed in groove 88, and a sealing means, such as an O-ring 94, is disposed in groove 90. With no adjustable loading on graphite ring 92, it is susceptible to leakage.

In each of the prior art valves of FIGS. 3–5, graphite rings are used to seal radially between the valve stem and the stem seal housing. In order for the graphite seals 70 and 78 of FIGS. 3 and 4 to seal properly, considerable loading must be applied axially thereto which corresponds to relatively high radial loading. This radial loading makes it more difficult to turn the valve stem and operate the valve. Also, the graphite rings tend to cause corrosion on the surfaces in which they come in contact, such as the outside diameter of the valve stem and the corresponding bore in the stem seal housing, and this corrosion can increase the likelihood of leakage as well as increasing the resistance on the valve stem, making it more difficult to rotate for operation of the valve.

DESCRIPTION OF THE PREFERRED EMBODIMENT

Referring now to FIG. 6, the valve with fire-resistant seal of the present invention is shown and generally designated by the numeral 100. Valve 100 is basically a variation of the prior art valve 10 shown in FIG. 1, and many of the components are substantially identical.

Valve 100 comprises a valve body 102 comprising a body portion 103 and an adapter 105 defining a pair of ports 104 and 106 for valve body 102 therein, respectively. Body portion 103 and adapter 105 are connected by a plurality of fasteners 107 of a kind known in the art. A ball element 108 is rotatably disposed in valve body 102 with sealing provided therebetween by a sealing means, such as a plurality of seals 110. Ball element 108 defines an opening 112 therethrough. When valve 100 is in the open position, as seen in FIG. 6, opening 112 is substantially aligned with ports 104 and 106 so that substantially restriction-free flow is possible through the valve. When ball element 108 is rotated approximately 90°, opening 112 is no longer aligned with ports 104 and 106 in valve body 102 so that the valve is in a closed position, and opening 112 is sealingly separated from ports 104 and 106 by seal 110. All of this portion of the construction of valve 100 is conventional.

Valve body 102 includes a stem seal housing portion 114, and a valve stem 116 is rotatably disposed in stem seal housing 114. Valve stem 116 has an enlarged inner end 118 which engages a slot 120 in ball element 108. Valve stem 116 also has a substantially cylindrical intermediate portion 121 and an outer end 122 which extends outwardly from stem seal housing 114 and has a pair of wrenching flats 124 defined thereon. Those skilled in the art will see that valve stem 116 is of a known construction, and is used to rotate ball element 108 in a conventional manner.

Referring to FIGS. 6 and 7, stem seal housing 114 defines a first bore 126 which is sized so that inner end 118 of valve stem 116 will fit therein. Stem seal housing 114 also defines a second bore 128, a larger third bore 130 and a still larger fourth bore 131 therein. Second bore 128 is sized so that intermediate portion 121 of valve stem 116 will rotatably fit therein. A packing set 132 of a kind known in the art is disposed between fourth bore 131 in stem seal housing 114 and valve stem 116 and is adapted to seal therewith. Packing set 132 comprises a plurality of V-rings 134, with a female ring 136 on the outer side of the V-rings and a male ring 138 on the inner side of the V-rings. A washer 140 is preferably disposed between male ring 138 and shoulder 142 extending between third bore 130 and fourth bore 131 in stem seal housing 114.

A spring or pressure loaded seal 144 is disposed in third bore 130 of stem seal housing 114 and seals between third bore 130 and intermediate portion 121 of valve stem 116. A packing follower 146 is positioned adjacent to female ring 136 of packing set 132. A packing retainer 148 is engaged with packing follower 146 and is attached to stem seal housing 114 by a fastening means, such as a plurality of studs 150 and nuts 152, in a known manner.

A locking ring 154 is held in place by a retainer ring 156 on outer end 122 of valve stem 116 to lock the valve stem as desired. The configuration of locking ring 154 is also known.

Figure 8:
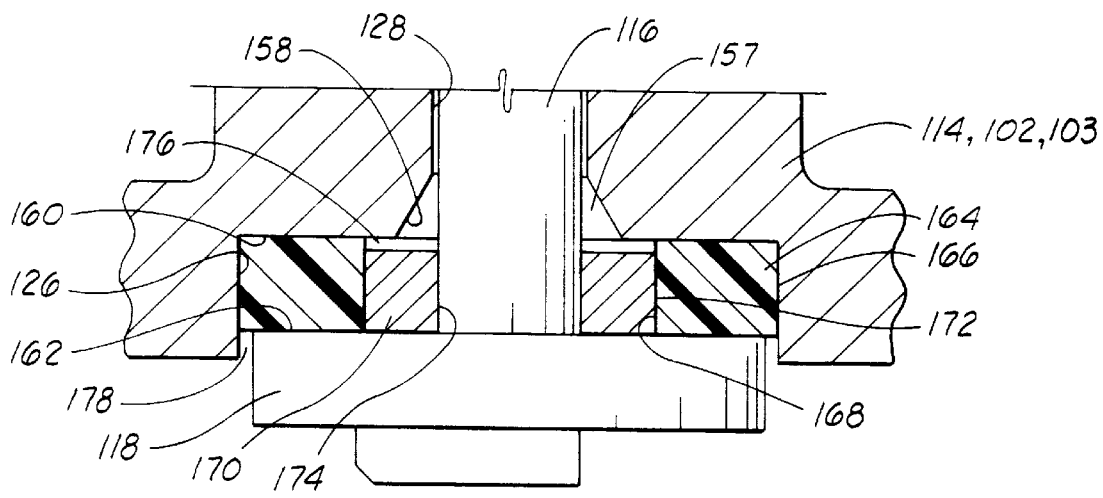
FIG. 8 is a cross-sectional view showing the initial position of components in the fire-resistant seal.
Figure 9:
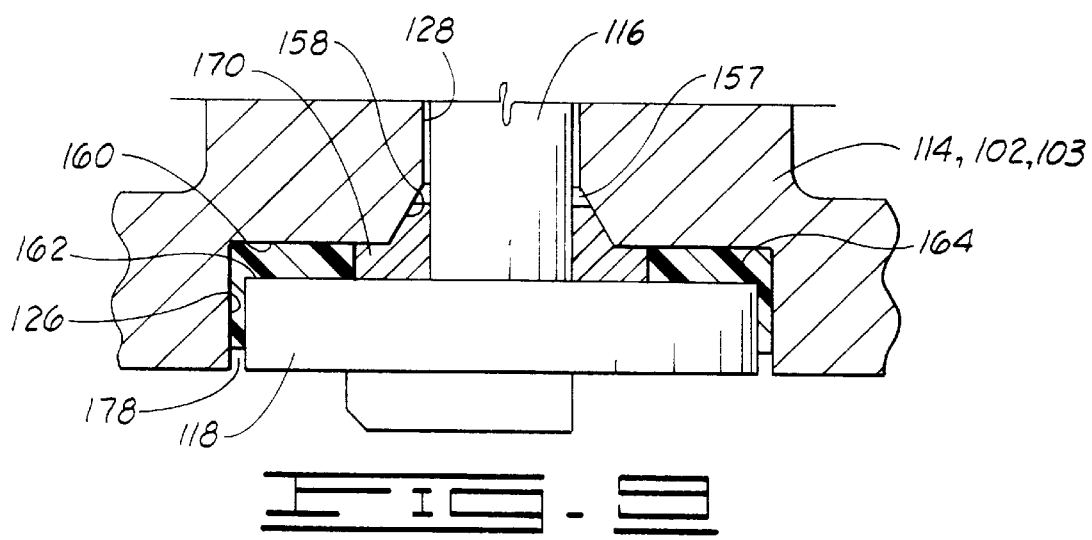

Referring now to FIGS. 7 and 8, the key aspects of the present invention will be discussed. At the lower end of second bore 120 in stem seal housing 114 is a cavity 157 preferably formed by a chamfered surface 158 which extends outwardly and away from second bore 128. Cavity 157 could be defined by other configurations in addition to chamfered surface 158. For example but not by way of limitation, a radiused surface could be used. Stem seal housing portion 114 of valve body 112 defines a body bearing surface 160 therein which generally extends between chamfered surface 158 and first bore 126. Thus, it will be seen that cavity 157 and chamfered surface 158 extend away from body bearing surface 160.

Inner end 118 of valve stem 116 defines a stem bearing surface 162 which generally faces body bearing surface 160 and chamfered surface 158 and is substantially parallel to the body bearing surface.

A thrust bearing 164 is disposed between body bearing surface 160 and stem bearing surface 162. Thrust bearing 164 has an outside diameter 166 sized to closely fit within first bore 126 in stem seal housing 114 and has an inside diameter 168 spaced radially outwardly from intermediate portion 121 of valve stem 116. In the initial position shown in FIGS. 7 and 8, thrust bearing 164 is engaged with body bearing surface 160 and stem bearing surface 162 because of pressure loading on valve stem 116 which provides thrust loading which tends to force the valve stem outwardly with respect to valve body 102. That is, valve stem 116 is forced upwardly, as seen in FIGS. 7 and 8, so that stem bearing surface 162 presses against thrust bearing 164 and forces it into engagement with body bearing surface 160.

A fire-resistant seal 170 is disposed between inside diameter 168 of thrust bearing 164 and intermediate portion 121 of valve stem 116. Fire-resistant seal 170 has an outside diameter 172 sized to fit closely within inside diameter 168 of thrust bearing 164, and the fire-resistant seal has an inside diameter 174 sized to fit closely around intermediate portion 121 of valve stem 116.

The initial thickness of fire-resistant seal 170 is less than the initial thickness of thrust bearing 164 such that the fire-resistant seal is spaced from at least one of said body bearing surface 160 and said stem bearing surface 162. When valve 100 is oriented as seen in FIG. 6 with outer end 122 of valve stem 116 being pointed upwardly, fire-resistant seal 170 simply rests on stem bearing surface 162 and a gap 176 is defined between the fire-resistant seal and body bearing surface 160. That is, any thrust loading from valve stem 116 as a result of fluid pressure acting thereon is totally absorbed initially by thrust bearing 164, and no thrust loading is initially applied to fire-resistant seal 170.

In normal operation, valve stem 116 is rotated in a known manner to actuate ball element 108. Normal sealing on intermediate portion 121 of valve stem 116 is provided by the primary seal comprising packing set 132 and the pressure or spring-actuated seal 144. Thrust loading on valve stem 116 is absorbed by thrust bearing 164. Thrust bearing 164 is preferably formed of a resilient, self-lubricating material, such as PTFE, to facilitate the rotation of valve stem 116. Thus, it will be seen by those skilled in the art that the normal operation of valve 100 is essentially the same as prior art valve 10 previously described.

Figure 9:
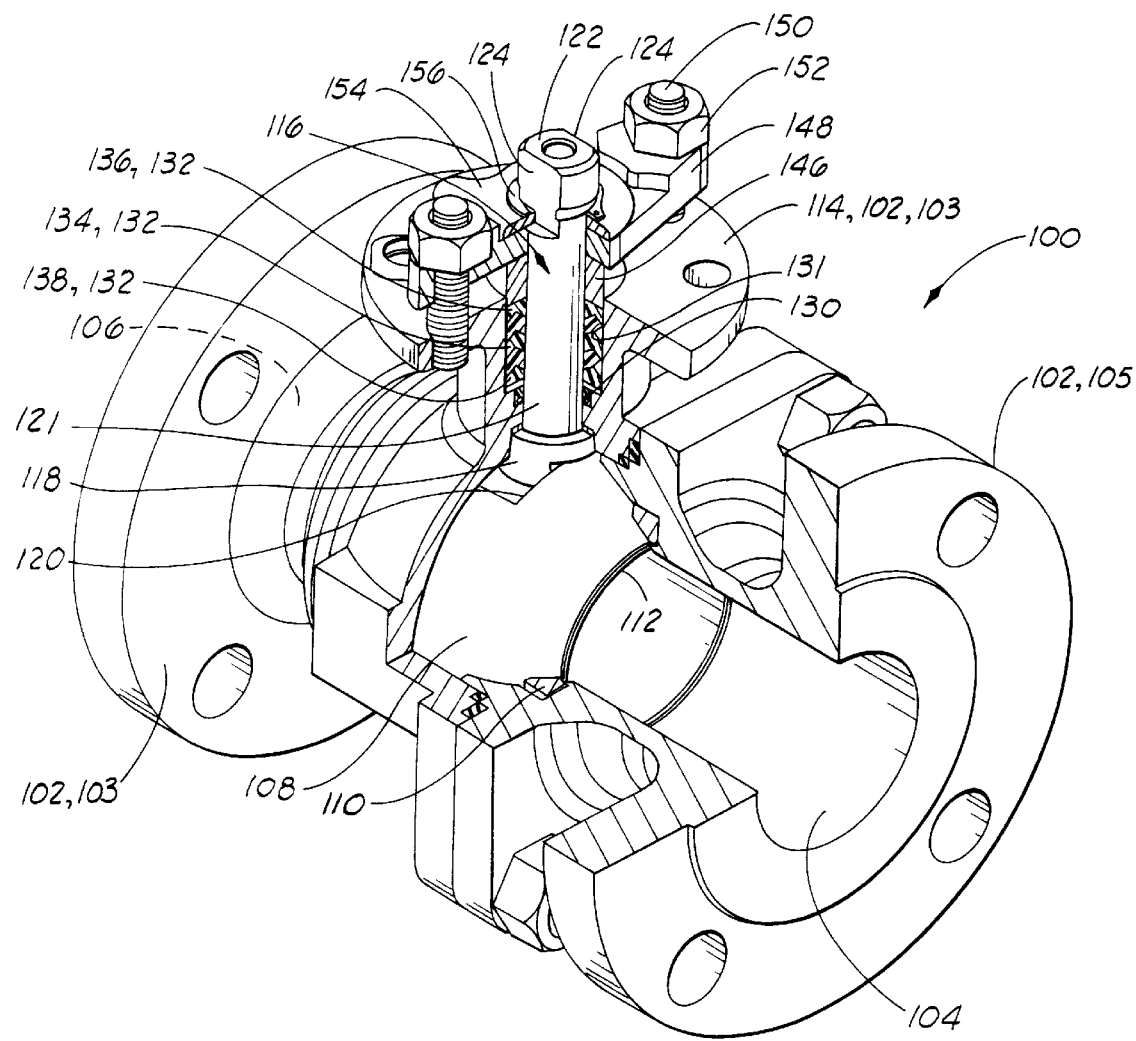
FIG. 9 is a cross section showing the fire-resistant seal after some excessive heat has been applied thereto.

However, valve 100 of the present invention and prior art valve 10 operate totally differently in the event of an extreme heat condition such as might occur when valve 100 is exposed to fire. In such a fire situation, heat will damage or destroy packing set 132 and pressure or spring-actuated seal 144. Also, the heat will destroy or damage thrust bearing 164. As shown in FIG. 9, as heat is applied, thrust bearing 164 is consumed by the heat and/or portions of the thrust bearing are extruded outwardly through a radial gap 178 defined between inner end 118 of valve stem 116 and first bore 126 in stem seal housing 114.

Fire-resistant seal 170 is preferably made of a material which is not damaged by heat, such as graphite, and it is not consumed or deformed by the heat. As thrust bearing 164 is destroyed, fire-resistant seal 170 will be brought into sealing engagement with body bearing surface 160 as the thickness of thrust bearing 164 is reduced by heat because the fluid pressure in valve 100 continues to act outwardly on valve stem 116. That is, stem bearing surface 162 eventually will be forced against fire-resistant seal 170 so that the fire-resistant seal is forced sealingly against body bearing surface 160. See FIG. 9.

Figure 10:
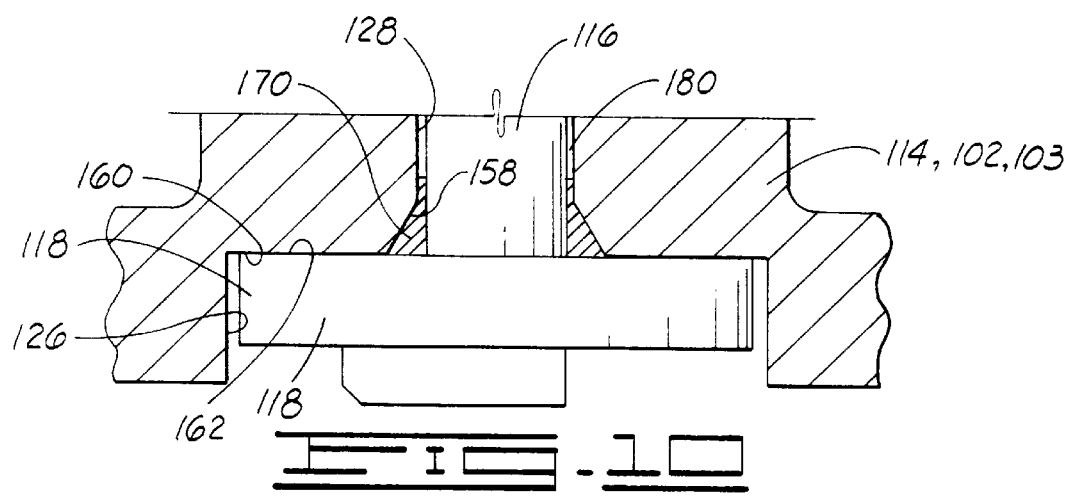
FIG. 10 illustrates the fire-resistant seal of the present invention after substantially complete destruction of a thrust bearing portion of the seal.

The graphite material of fire-resistant seal 170 is relatively soft, and as thrust bearing 164 is gradually totally destroyed, fire-resistant seal 170 is forced upwardly into cavity 157 defined by chamfered surface 158 so that it takes a generally conical shape as seen in FIG. 10. Eventually, stem bearing surface 162 is substantially brought into engagement with body bearing surface 160. This may provide some degree of metal-to-metal sealing, but that is not normally sufficient to meet industrial standards. Fire-resistant seal 170, when forced into cavity 157 defined by chamfered surface 158 will thus sealingly engage chamfered surface 158, the portion of stem bearing surface 162 below the chamfered surface, and the adjacent surface of intermediate portion 121 of valve stem 116 above inner end 118 thereof. A small portion of fire-resistant seal 170 even may be extruded further outwardly into a radial gap 180 defined between valve stem 116 and second bore 128 in stem seal housing 114, again as seen in FIG. 10.

Fire-resistant seal 170 will thus seal around valve stem 116 so that fluid is not leaked outwardly from valve 100 even though extreme heat has been applied to the valve.

After the fire or other extreme heat condition is under control, valve 110 may be disassembled and refitted with a new packing set 132, pressure of spring-actuated seal 144, thrust washer 164 and fire-resistant seal 170. Of course, any other seals and O-rings in valve 100 may also be refitted. Such refitting of valve 100, is only done when the metal components of the valve have not been damaged or the integrity thereof compromised. In some cases, it may be necessary to discard valve 100 and replace it with a new one.

The valve of the present invention may thus be operated in normal conditions in a manner similar to prior art valves while providing a method of sealing around valve stem 116 even in the event of high heat conditions, such as fire. Because fire-resistant seal 170 is not activated until the fire actually occurs, the problems associated with corrosion and high loading of graphite seals, such as shown in the prior art of FIGS. 3–5 are not present in the new invention. Those skilled in the art will see that the interaction of thrust bearing 164, fire-resistant seal 170, chamfered surface 158, body bearing surface 160 and stem bearing surface 162 may be easily applied to other valve configurations utilizing rotating valve stems, and the invention is not intended to be limited to a ball valve configuration. For example, a plug valve or gate valve which utilizes a rotating valve stem could incorporate the unique fire-resistant sealing arrangement of the present invention.

It will be seen, therefore, that the valve with fire-resistant seal of the present invention is well adapted to carry out the ends and advantages mentioned, as well as those as inherent therein. While a presently preferred embodiment of the invention has been shown for the purposes of this disclosure, numerous changes in the arrangement and construction of parts may be made by those skilled in the art. All such changes are encompassed within the scope and spirit of the appended claims.

What is claimed is:

1. A sealing apparatus for a valve having a rotatable stem and a valve body, said apparatus comprising;

primary sealing means disposable in the valve for sealing between the stem and the body;

a thrust bearing disposable in the valve between the stem and body and adapted for initially absorbing thrust loading on the stem; and a fire-resistant seal disposable in the valve between the stem and body, said fire-resistant seal initially not sealing between the stem, trust bearing and body when the valve is fully assembled and said thrust bearing is absorbing said trust loading on the stem;

wherein, if said thrust bearing is substantially damaged by heat and thereby no longer able to absorb said thrust loading, said thrust loading will be at least partially absorbed by said fire-resistant seal such that said fire-resistant seal is forced into sealing engagement between the stem and body.

2. The apparatus of claim 1 wherein said fire-resistant seal has an initial thickness less than an initial thickness of said thrust bearing.

3. The apparatus of claim 1 wherein said thrust bearing and said fire-resistant seal have an annular configuration.

4. The apparatus of claim 3 wherein said thrust bearing and said fire-resistant seal are concentric.

5. The apparatus of claim 3 wherein said fire-resistant seal has an outside diameter smaller than an inside diameter of said thrust bearing.

6. The apparatus of claim 1 wherein said thrust bearing is made of a non-metallic material.

7. The apparatus of claim 6 wherein said non-metallic material is resilient.

8. The apparatus of claim 7 wherein said material is reinforced polytetrafluorethylene.

9. The apparatus of claim 1 wherein said fire-resistant seal is made of graphite.

10. A valve apparatus comprising:

a valve body defining a pair of ports therein;

a stem moveably disposed in said body;

a valve element disposed in said body and having an open position in which said ports are in fluid communication and a closed position in which said ports are separated from one another, said valve element being moveable between said open and closed positions in response to movement of said stem;

a thrust bearing disposed between said body and stem and adapted for initially, substantially absorbing thrust loading on said stem; and a seal disposed between said body and stem, said seal initially not sealing between said stem, thrust bearing and body, said seal being adapted for sealing between said body and stem and at least partially absorbing said thrust loading only after said thrust bearing is substantially damaged by heat.

11. The apparatus of claim 10 wherein:

the apparatus is a ball valve; and said valve element is a valve ball engaged with said stem.

12. The apparatus of claim 10 wherein said body defines a cavity therein adjacent to said seal such that said seal is at least partially forced into said cavity and thereby sealingly engaged with said stem and valve body as a result of thrust loading on said stem after said thrust bearing is substantially damaged by said heat.

13. The apparatus of claim 10 wherein:

said body defines a body bearing surface thereon;

said stem defines a stem bearing surface thereon generally facing said body bearing surface;

said seal is initially disposed between said body bearing surface and said stem bearing surface such that said seal is not sealingly enraged with at least one of said body bearing surface and said stem bearing surface; and said thrust bearing is initially disposed between said body bearing surface and said stem bearing surface such that said thrust bearing engages said body bearing surface and said stem bearing surface.

14. The apparatus of claim 13 wherein said thrust bearing and said seal have an annular configuration.

15. The apparatus of claim 14 wherein said thrust bearing and said seal are substantially concentric.

16. The apparatus of claim 13 wherein said seal is positioned radially inwardly of said thrust bearing.

17. The apparatus of claim 13 wherein:

said body defines a cavity adjacent to said body bearing surface; and at least a portion of said seal is forced into said cavity by thrust loading on said stem after said thrust bearing is substantially damaged by heat such that said seal is sealingly engaged with said stem and said valve body.

18. The apparatus of claim 17 wherein said cavity is formed by a chamfered surface in said body.

19. The apparatus of claim 17 wherein said cavity is formed by a radiused surface in said body.

20. The apparatus of claim 13 wherein:

said thrust bearing is initially engaged with both of said body and stem bearing surfaces and has a thickness defining a spacing between said body and stem bearing surfaces; and said seal is initially spaced from at least one of said body and stem bearing surfaces and engages both of said body and stem bearing surfaces when said thickness of said thrust bearing is reduced by application of heat thereto.

21. The apparatus of claim 20 wherein:

said body defines a cavity therein extending from said body bearing surface; and at least a portion of said seal is forced into said cavity as said thickness of said thrust bearing is reduced by application of said heat thereto such that said seal is sealingly engaged with said stem and said valve body.

22. The apparatus of claim 21 wherein said cavity is defined by a chamfered surface extending from said body bearing surface.

23. The apparatus of claim 10 wherein said stem bears against said thrust bearing as a result of fluid pressure in said body.

24. The apparatus of claim 10 wherein said thrust bearing is non-metallic.

25. The apparatus of claim 24 wherein said thrust bearing is made of a substantially resilient material.

26. The apparatus of claim 25 wherein said material is reinforced polytetrafluorethylene.

27. The apparatus of claim 10 wherein said seal is made of a heat-resistant material.

28. The apparatus of claim 27 wherein said heat-resistant material is graphite.

29. The apparatus of claim 10 wherein said stem is rotatable with respect to said body.

30. The apparatus of claim 10 wherein said seal initially has a thickness less than a thickness of said thrust bearing.

31. A valve apparatus comprising:

a valve body defining a pair of ports therein, said body having a body bearing surface thereon;

a stem rotatably disposed in said body, said stem having a stem bearing surface thereon spaced from said body bearing surface, said stem bearing surface being biased in an axial direction toward said body bearing surface by thrust loading from fluid pressure in said body;

a valve element engaged with said stem and movable in said body by rotation of said stem between an open position in which said ports are in fluid communication and a closed position in which fluid communication between said ports is prevented;

a thrust bearing disposed between said body and said stem bearing surfaces and initially engaged therewith such that said thrust loading on said stem is absorbed by said thrust bearing; and a seal disposed between said body and stem bearing surfaces and initially unengaged with at least one of said body and stem bearing surfaces in the fully assembled valve apparatus, said seal being adapted for sealing between said body and stem bearing surfaces and at least partially absorbing said thrust loading only after said thrust bearing is substantially damaged by heat.

32. The apparatus of claim 31 wherein:

said thrust bearing is made of a non-metallic material; and said seal is made of a heat-resistant material;

wherein, if said thrust bearing is damaged by heat applied thereto, said thrust loading is absorbed by said seal such that said seal sealingly engages both of said body and stem bearing surfaces.

33. The apparatus of claim 32 wherein:

said body defines a cavity adjacent to said body bearing surface; and said seal is at least partially forced into said cavity as a result of said thrust loading when said thrust bearing is damaged by said heat.

34. The apparatus of claim 33 wherein said cavity is defined by a chamfered surface extending from said body bearing surface.

35. The apparatus of claim 33 wherein said cavity is defined by a radiused surface extending from said body bearing surface.

36. The apparatus of claim 32 wherein said non-metallic material is resilient.

37. The apparatus of claim 36 wherein said non-metallic material is reinforced polytetrafluorethylene.

38. The apparatus of claim 32 wherein said heat-resist ant material is graphite.

39. The apparatus of claim 31 wherein said seal is disposed radially inwardly of said thrust bearing.

40. The apparatus of claim 31 wherein said thrust bearing and said seal have an annular configuration.

41. The apparatus of claim 40 wherein said thrust bearing has an inside diameter greater than an outside diameter of said seal.

42. The apparatus of claim 31 wherein an initial thickness of said thrust bearing is greater than an initial thickness of said seal.

43. The apparatus of claim 31 characterized as a ball valve wherein said valve element is a valve ball rotatable in said body.

44. A valve apparatus comprising:

a valve body having a body bearing surface thereon, said body defining a cavity adjacent to said body bearing surface and further defining a pair of ports therein;

a stem rotatably disposed in said body, said stem having a stem bearing surface thereon generally facing said body bearing surface;

a valve element disposed in said body and having an open position in which said ports are in fluid communication and a closed position in which said ports are separated from one another, said valve element being moveable between said open and closed positions in response to movement of said stem;

a thrust bearing disposed between said body and said stem bearing surfaces and initially adapted for substantially absorbing thrust loading on said stem; and a seal disposed and initially not providing sealing engagement between said body and stem bearing surfaces and said thrust bearing, said seal being positioned adjacent to said cavity;

wherein, if said thrust bearing is substantially damaged by heat applied thereto, at least a portion of said seal is forced by said thrust loading into said cavity such that said seal provides sealing engagement between said body and stem bearing surfaces.

45. The apparatus of claim 44 wherein said cavity is formed by a chamfered surface extending from said body bearing surface.

46. The apparatus of claim 44 wherein said thrust bearing and said seal have an annular configuration.

47. The apparatus of claim 46 wherein said thrust bearing and said seal are substantially concentric.

48. The apparatus of claim 44 wherein said seal is positioned radially inwardly of said thrust bearing.

49. The apparatus of claim 44 wherein said thrust bearing has an initial thickness greater than an initial thickness of said seal.

50. The apparatus of claim 44 wherein said stem bears against said thrust bearing as a result of fluid pressure in said body.

51. The apparatus of claim 44 wherein said thrust bearing is non-metallic.

52. The apparatus of claim 51 wherein said thrust bearing is made of a substantially resilient material.

53. The apparatus of claim 52 wherein said material is reinforced polytetrafluorethylene.

54. The apparatus of claim 44 wherein said seal is made of a heat-resistant material.

55. The apparatus of claim 54 wherein said heat-resistant material is graphite.

* * * * *